INVENTOR
EDWIN F. HUDDLE

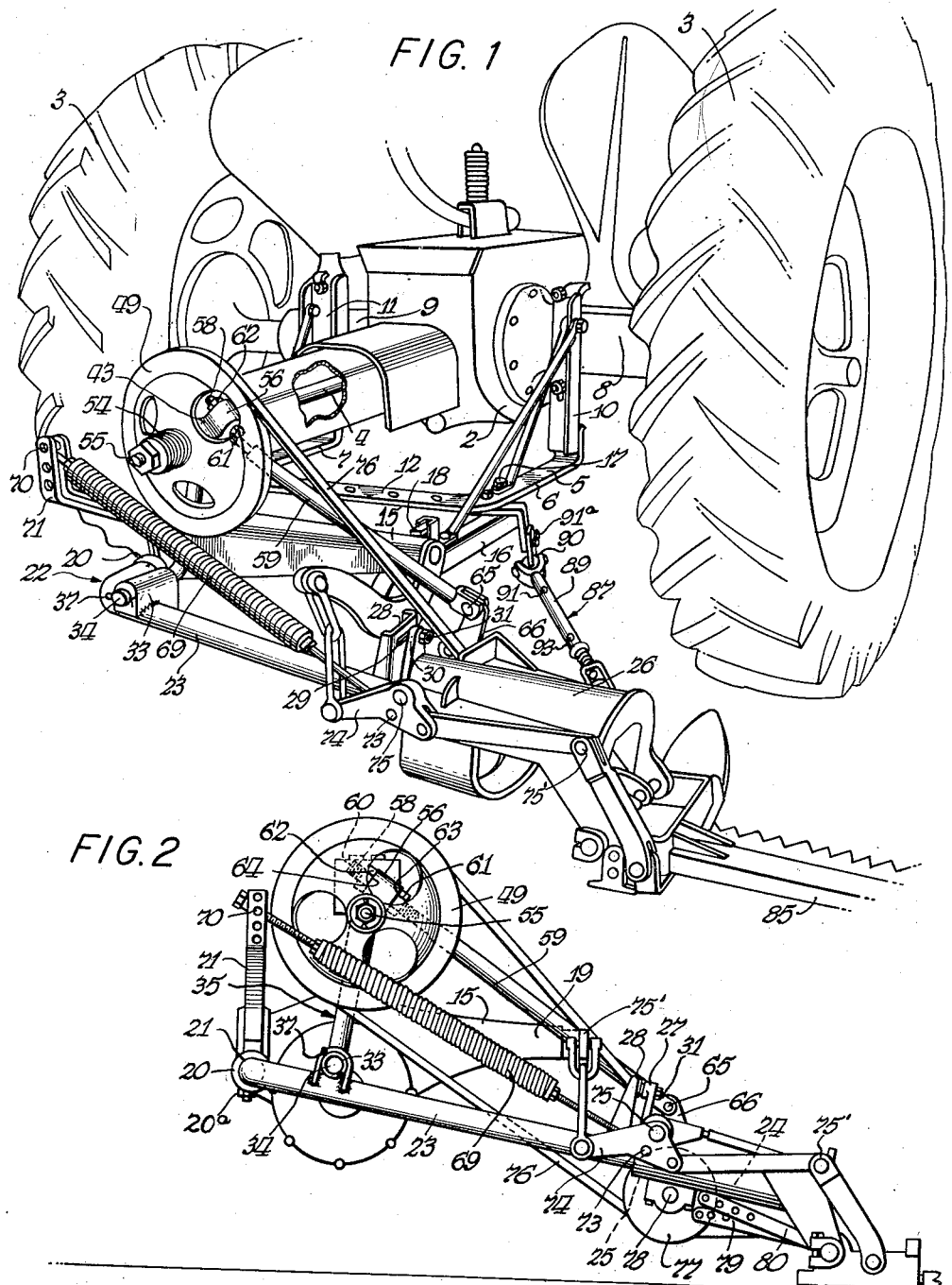

ATTORNEY

United States Patent Office 2,767,539
Patented Oct. 23, 1956

2,767,539

UNIMOUNT DRIVE POWER TRANSMISSION UNIT

Edwin F. Huddle, Elmwood Park, Ill., assignor to International Harvester Company, a corporation of New Jersey Application October 9, 1953, Serial No. 385,219

9 Claims. (Cl. 56—25)

This invention relates to a novel mounting for a power transmission unit and more particularly to such a mounting for a mower drive.

A general object of the invention is to provide a simplified mounting for such a power transmission assembly of lightweight construction and wherein the various frame members are so arranged as to provide rigid although adjustable structure.

A more specific object of the invention is to devise a mounting for the power take-off pulley from the mower coupling bar wherein the coupling bar forms part of a triangular support incorporating an upright bar pivoted at its lower end to the coupling bar and at its upper end supporting a bearing which mounts the power-take-off shaft, the bearing being connected to a diagonal member which at its other end is connected to the mower support yoke.

A further object is to mount the mower and the drive therefor on a spring part of the mower frame to absorb vibrations developed through unbalancing forces in the transmission system.

These and other objects of the invention will become more apparent from the specification and the drawings wherein:

Figure 1 is a rear perspective view of a mower mounting structure incorporating the invention, the structure being shown in association with a supporting tractor;

Figure 2 is a rear view of the mounting structure;

Figure 3:
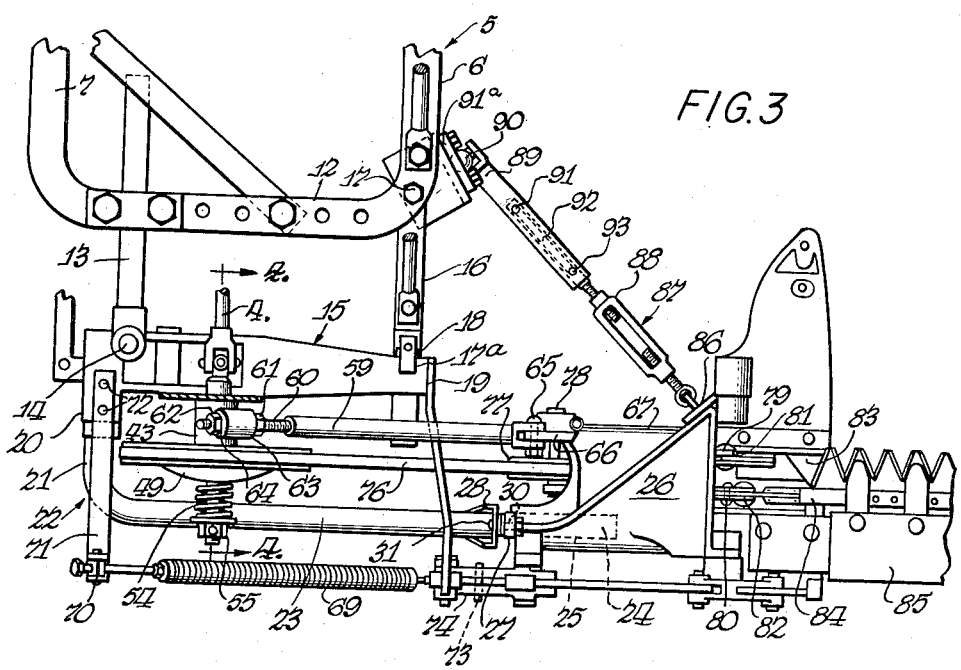
Figure 3 is a plan view of the mower mounting.

Referring to the drawings, the mower is mounted on a tractor having a body 2, rear driving wheels 3, and a rearwardly extending, engine driven power take-off shaft 4. The tractor supports a drawbar 5 U-shaped in plan as best seen in Figure 3, the drawbar comprising a pair of fore and aft extending side legs 6 and 7 which at their forward ends are connected to the rear axle housings 8 and 9 through quick attaching brackets 10 and 11. The rear ends of the legs 6 and 7 of the drawbar 5 are interconnected by a transverse generally horizontal bar member 12 to one end of which is attached a rearwardly extending jaw member 13, the rear end of the jaw member 13 being pivoted on a substantially vertical axis by means of a pin 14 to one end of a transverse mower frame member generally designated 15, said member 15 being in the form of a casting and having its opposite end slidably mounted upon the rear end of a support bar or tongue 16 which at its forward end is bolted as at 17 to the drawbar 5 on its leg 6. The member 15 is provided with a ledge 17a on its top side which is engaged by a downwardly spring loaded lock or latch member 18 which holds member 15 to tongue 16 against vertical vibration. It will be noted that the frame structure 15 is rotatable about the vertical axis 14 with the grassward end 19 of the frame member 15 swinging rearwardly upon the mower striking an obstruction as well-known to those skilled in the art. In such swing back position of the mower the member 15 rides off the rear end of the support bar 16 after disengaging from the locking member 18.

The member 15 is provided at its stubbleward end with a fore and aft extending socket 20 into which extends a fore and aft extending end portion 21 of a coupling bar generally designated 22, said coupling bar having a transversely extending portion 23 projecting substantially at right angles to the portion 21 from the rear end thereof in a grassward direction. The portion 21 and socket 20 have a bayonet interlock at 20a to prevent separation. The grassward end 24 of the portion 23 of the coupling member 22 is entered into a socket 25 in a yoke member 26 which is in the form of a casting and provided with an upwardly extending lug 27 above the socket in vertical alignment with the portion 23 of the coupling arm and in alignment axially with an upstanding racket lug 28 welded on portion 23 and which is provided with an arcuate slot 29 through which and through a registering opening 30 in the lug 27 extends a bolt 31. It will be seen that the socket 25 is located along the rear edge of the yoke member 26 and that fore and aft inclination of the yoke member 26 is determined by the setting of the bolt 31 holding the lugs 28 and 30 in preselected relation. The bar portion 23 of the coupling arm assembly 22 is secured or welded connected adjacent to its stubbleward end to a socket member or sleeve 33 receiving the lower end or leg 34 of an upright support member or standard generally designated 35, the leg 34 pivoting on a fore and aft extending axis at right angles to the portion 23 of the coupling bar generally parallel to the portion 21 and disposed generally horizontally, the leg portion 34 being provided adjacent to the forward end of socket 33 with a stop 36 in the form of a washer welded thereto which abuts against the forward end of the socket member 33 and the rear end of the leg 34 projects rearwardly of the socket member 33 and is provided with a cotter pin 37 in abutment with the rear edge of the socket member whereby the stop 36 and the key 37 hold the mounting member 35 against movement axially of the socket 33. The forward end of the leg 34 merges into the lower end of an upstanding leg 39 of said member 35 and the upper end of the leg 39 is entered into a socket 40 and keyed thereto as by transverse pin 41 which intersects the socket and extends into a cutout 42 in the peripheral of the leg 39.

The socket 40 is formed as a depending portion of a combination connector member and bearing housing generally designated 43 and together with member 35 constituting a mounting, said element 43 comprising a tubular body portion 44 which extends generally parallel to the socket 33 and at each end is provided with bearings 45 and 46 which journal a shaft 47, the forward end of the shaft 47 being connected through a universal joint or knuckles 48 to and forming part of the power take-off shafting 4 and the rear end of the shaft rotatably mounts a driving sheave or pulley wheel 49, the pulley 49 being provided with a clutch portion 50 in the form of a series of teeth which mate with releasable clutch teeth 51 of a clutch member 52 which is keyed as at 53 to the power shaft 47 for rotation therewith. It will be seen that the spring 54 which is compressed between the wheel 49 and the abutment member 55 which is connected to the shaft 47 urges the wheel 49 into clutch engagement with the clutch part 52 and that when the wheel 49 is prevented from rotating the clutch parts will disengage in order to relieve the overload.

Figure 4:
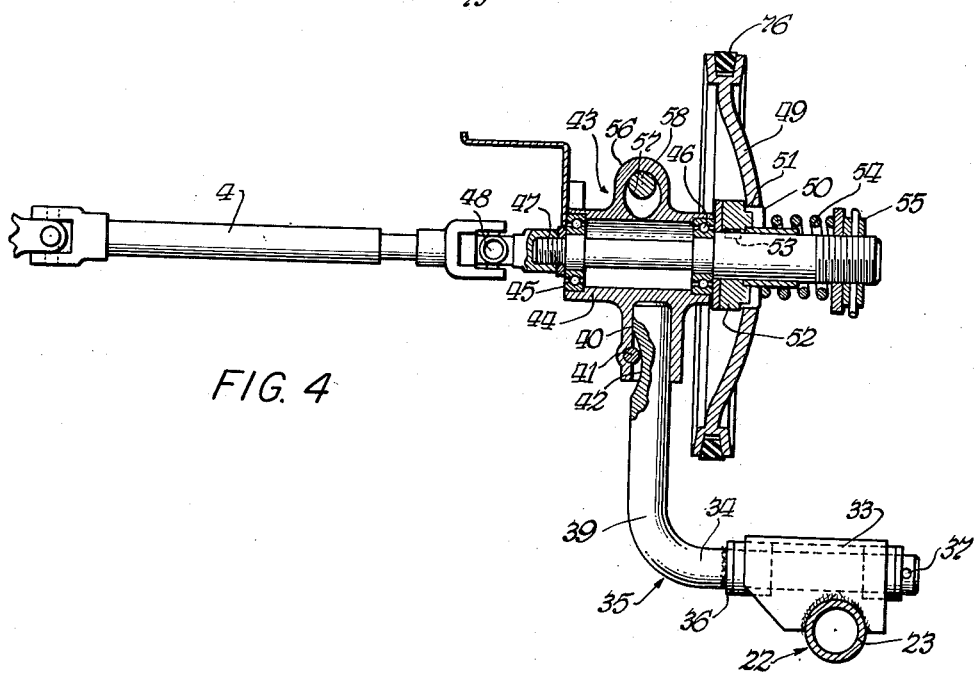
Figure 4 is an enlarged sectional view taken substantially on the line 4—4 of Figure 3.

The connector member 43 is provided on its top side with a lug portion 56 which is provided with an oval shaped opening or slot 57 extending transversely of the axis of the power or driving shaft 47, and receiving and providing a slotted connection with one end or upper end 58 of a diagonal adjusting member 59 therethrough to accommodate its rotation about the axis of member 23. It is seen from the consideration of Figure 4 that the end portion 58 of the member 59 is smaller than opening 57 and is provided with a threaded portion 60 on which are threaded nuts 61 and 62 in engagement with ends or sides 63 and 64 of the lug portion 56. It will be seen that the member 59 extends diagonally downwardly in a grassward direction and that its opposite lower end is pivotally connected by a bolt 65 (on an axis generally parallel to the axis of the shaft 47 and the axis of pivot of the leg 34 of the standard 35) to the upper end of an upstanding lug element 66 which may be formed integral or connected with the yoke 26 adjacent to its forward edge 67. It will be realized that the coupling arm portion 23, the member 35, and the member 59 form a triangular support framework for the power take-off shafting 4 and the drive wheel 49 which form part of the transmission.

It will be seen that the power drive transmission support subframe 59, 35, 23 is resiliently supported by means of a tension spring 69 which extends in a transverse plane generally parallel to the upright planes of the members 59 and 23 and the spring 69 has its upper end adjustably connected as at 70 to an upstanding portion, anchor member or arm 71 connected to the upsprung frame member 15 at its stubbleward end as at 72 and projecting rearwardly therefrom above the coupling bar, the spring 69 sloping downwardly in the grassward direction and at its lower end being connected as at 73 to the yoke 26 through the medium of a lever 74 which is pivoted to the yoke as at 75, the lever 74 forming part of the lifting linkage 75' of the mower, said lifting linkage being substantially of a conventional design and per se forms no part of the present invention and therefore will not be described in detail.

The pulley 49 drives an endless belt 76 which is trained about pulley or sheave 77 which is connected to a double crank 78 mounted in the yoke 26 driving a pair of pitmans 79 and 80 which are connected as at 81 and 82 to knife blades 83 and 84 of a mower means or cutting mechanism generally designated 85.

The yoke 26 is connected through an eye bolt as at 86 to the rear end of a drag link 87 which comprises releasably telescoping members 88 and 89, the member 89 having a ball joint connection 90 at its forward end with a depending bracket 91a connected to leg 6 of the drawbar 5.

It will be appreciated, that the mower upon striking an obstruction will swing rearwardly about the axis 14 with the attendant extension of members 88 and 89, the member 89 being provided with a shear pin 91 extending through an elongated slot 92 in the member 88 and the member 89 having a stop pin 93 also extending through slot 92. The pin 91 will shear to permit the mower to swing back upon striking an obstruction and the pin 93 limits the extension of members 88 and 89.

It will be seen that a novel mounting for the mower drive is provided such that when the mower is swung back and elevated the drive continues and the sprung frame or support 23, 35, 59 supports or carries the power transmission 4, 49, 76, 77 from the unsprung support or ambulant structure including the tractor, the drawbar 5 and the member 15.

What is claimed is:

1. A mounting for a power drive of a mower of the type including a frame for mounting on a tractor having a rear fore and aft power take-off shaft, means extending grasswardly from said frame including cutting mechanism having a coupling bar with a fore and aft extending portion at one end pivoted to said frame and a yoke at the other end, a standard having a lower end pivoted to said coupling bar adjacent said portion on a fore and aft axis, said standard extending upwardly from said bar and terminating in an upper end, a connector element carried by said upper end of said standard, a diagonal adjusting and connecting member extending between said element and said yoke and connected thereto, means including a fore and aft power shaft rotatably supported on said element for connection to said power take-off shaft in substantial axial alignment therewith and including knuckles for accommodating universal movement of said power shaft relative to said power take-off shaft attendant to vertical swinging movement of said first mentioned means of said portion of said coupling bar relative to said frame, and means drivingly interconnecting said power shaft and said cutting mechanism and entirely supported upon said first-mentioned means.

2. The combination according to claim 9 and said drive transmitting means comprising an output member operably connected to said cutting mechanism, means rotatably mounting said output member on said coupling bar on a fore and aft axis, sheaves connected respectively to said power shaft and to said output member, and a belt trained about said sheaves, said frame member adjustable longitudinally to swing said standard toward and away from said output member to vary the spacing between said sheaves and thereby adjust the tension in said belt.

3. The combination according to claim 1 and said adjusting member extending generally parallel to said coupling bars, and adjusting means operatively associated with said adjusting member and said element for moving said standard with said power shaft transversely as respects the power take-off shaft of the tractor for axially aligning said power shaft with said power take-off shaft.

4. In a mounting for a mower drive, an unsprung ambulant support, a sprung frame, means spring-supporting said frame from said unsprung support, mower means connected to said spring-supported frame, and power transmission means for said mower means operatively connected thereto and mounted on and entirely carried by said sprung frame, and said first-mentioned means further disposed in shock-absorbing relation to said mower means for dissipating operational vibrations developed thereby.

5. In a mounting for a mower drive transmission, an unsprung ambulatory support including a power source, a coupling bar pivoted at one end to said support on a fore and aft generally horizontally extending axis, mower means carried from the opposite end of said coupling bar, a mounting carried upon said coupling bar intermediate its ends, a shaft assembly journalled on said mounting on a generally fore and aft axis, a pulley connected to said shaft, drive transmitting means operatively connected between said pulley and said mower means, said unsprung support having an upstanding arm extending above said coupling bar and a tension spring having a lower end connected to said opposite end of said coupling bar and having an upper end connected to said arm of said unsprung support and spring supporting said coupling bar and the drive transmitting means, mower means, power take-off shaft and pulley and oriented in opposition to and in at least partially absorbing relation to vibrations resulting from unbalancing forces developed by said pulley, said shaft, said drive transmitting means and said mower means.

6. In a mower, a support frame comprising a transverse frame member having stubbleward and grassward ends for mounting upon an associated tractor having a rear fore and aft power take-off shaft, a transverse coupling bar assembly having stubbleward and grassward ends and said stubbleward end pivoted to the corresponding end of said frame member on a fore and aft axis, a mounting member extending transversely of said coupling bar assembly and pivoted at one end to said coupling bar and pivoted at one end to said coupling bar assembly on a fore and aft axis, a connector connected to the other end of said mounting member, an element extending diagonally between said connector and the other end of said bar assembly and connected thereto, a driving shaft journalled in said connector on a fore and aft axis for connection to the power take-off shaft, mower driving means including a driven shaft with a pulley journalled on said other end of said coupling bar assembly on a fore and aft axis, a pulley connected to said driving shaft, a belt disposed in driven relation by said second-mentioned pulley and in driving relation to said first-mentioned pulley, said element being adjustable lengthwise attendant to rotation of said mounting member on its axis of pivot on said coupling assembly for adjusting the tension of said belt between said pulleys.

7. The combination according to claim 6 and said coupling assembly comprising a coupling bar extending grassward from the stubbleward end of said assembly, a yoke pivotally mounted on said bar at said grassward end of said assembly and pivotal about the principal axis of said bar and having a forward portion projecting forwardly of said bar, said element pivotally connected to said forward portion of said yoke, said element having a slotted connection with said connector for accommodating movement of said element in an arc about the principal axis of said bar, and locking means on said element selectively engageable with said connector for holding said yoke in a selected circumferentially adjusted position relative to said bar.

8. The combination according to claim 6 and said support frame having an upstanding portion at said stubbleward end of said frame member, and a tension spring extending between said upstanding portion and said grassward end of said coupling bar assembly in supporting relation to the latter.

9. A mounting for a power drive of a mower of the type having a fore and aft power shaft adapted for connection to a rear fore and aft power take-off shaft of a tractor in substantial axial alignment therewith and including means for accommodating transverse misalignment and angular displacement between said shafts, and said mower having a frame for mounting on the tractor; means extending grasswardly from said frame including cutting mechanism having a coupling bar pivoted at one end to said frame on a fore and aft axis for vertical movement to follow terrain conditions with said cutting mechanism and for positioning said mechanism for cutting at different heights; a standard extending upwardly from said coupling bar and having an upper end portion rotatably mounting said power shaft, said standard having a lower end pivoted to said coupling bar on a fore and aft axis to accommodate pivoting of said standard to position said power shaft in substantial axial alignment with said power take-off shaft, and a frame member extending diagonally between said coupling bar and said upper portion of the standard and pivotally connected to one thereof on a fore and aft axis and adjustably connected to the other thereof for holding said standard in a selected position, and drive transmitting means drivingly connected between said power shaft and said cutting mechanism and supported solely upon said coupling bar.

References Cited in the file of this patent
UNITED STATES PATENTS

| | | |
|---|---|---|
| 1,973,993 | Pearson | Sept. 18, 1934 |
| 2,248,022 | Geraldson | July 1, 1941 |
| 2,248,332 | Budelier et al. | July 8, 1941 |
| 2,269,980 | MacDonald | Jan. 13, 1942 |
| 2,335,510 | Hansen | Nov. 30, 1943 |
| 2,387,070 | Hilblom | Oct. 16, 1945 |
| 2,502,805 | Spurlin | Apr. 4, 1950 |
| 2,533,804 | Hitchcock | Dec. 12, 1950 |
| 2,616,234 | Love | Nov. 4, 1952 |
| 2,686,658 | Hill et al. | Aug. 17, 1954 |